United States Patent

Kuroda et al.

[11] Patent Number: 6,163,519
[45] Date of Patent: Dec. 19, 2000

[54] SCANNING NEAR-FIELD OPTICAL MICROSCOPE USING THE PROBE AND RECORDING AND/OR REPRODUCING APPARATUS USING THE PROBE

[75] Inventors: Ryo Kuroda, Kawasaki; Yasuhiro Shimada, Hadano, both of Japan

[73] Assignee: Canon Kabushiki Kaisha, Tokyo, Japan

[21] Appl. No.: 09/518,104

[22] Filed: Mar. 3, 2000

Related U.S. Application Data

[62] Division of application No. 08/825,129, Dec. 20, 1999, Pat. No. 6,046,972.

[30] Foreign Application Priority Data

Mar. 29, 1996 [JP] Japan ..................... 8-103361

[51] Int. Cl.[7] ................................................. G11B 7/00
[52] U.S. Cl. .............................................. 369/126; 250/306
[58] Field of Search .................................. 369/126, 100, 369/112, 44.15, 13; 250/306, 307, 234

[56] References Cited

U.S. PATENT DOCUMENTS

| | | | |
|---|---|---|---|
| 4,343,993 | 8/1982 | Binnig et al. | 250/306 |
| 4,724,318 | 2/1988 | Binnig | 250/306 |
| 5,132,533 | 7/1992 | Kawase et al. | 250/306 |
| 5,294,790 | 3/1994 | Ohta et al. | 250/216 |
| 5,304,795 | 4/1994 | Fujihira et al. | 250/234 |
| 5,333,495 | 8/1994 | Yamaguchi et al. | 250/306 |
| 5,343,460 | 8/1994 | Miyazaki et al. | 369/126 |
| 5,354,985 | 10/1994 | Quate | 250/234 |
| 5,581,083 | 12/1996 | Majumdar et al. | 250/306 |

FOREIGN PATENT DOCUMENTS

| | | |
|---|---|---|
| 0 112 402 | 7/1984 | European Pat. Off. . |
| 2-098849 | 4/1990 | Japan . |

OTHER PUBLICATIONS

Dürig, U., et al., "Near–Field Optical–Scanning Microscopy", Journal of Applied Physics, vol. 59, No. 10, pp. 3318–3327 (May 15, 1986).

Reddick, R.C., et al., "New Form of Scanning Optical Microscopy", The American Physical Society, Physical Review B, vol. 39, No. 1, pp. 767–770 (Jan. 1, 1989).

*Primary Examiner*—Thang V. Tran
*Attorney, Agent, or Firm*—Fitzpatrick, Cella, Harper & Scinto

[57] ABSTRACT

In a method of manufacturing a probe with a minute aperture, the probe is coated with conductive material, a tip of the probe is brought into contact with a conductive substrate and a voltage is applied between the probe and the substrate to remove the coating material at the tip of the probe and form the minute aperture at the tip of the probe. The thus-fabricated probe can be used in a scanning near-field optical microscope for observing an object on the basis of a change in intensity of near-field light and an information recording and/or reproducing apparatus for reproducing information recorded in a record medium by using near-field light.

4 Claims, 7 Drawing Sheets

ANODE JUNCTION PORTION

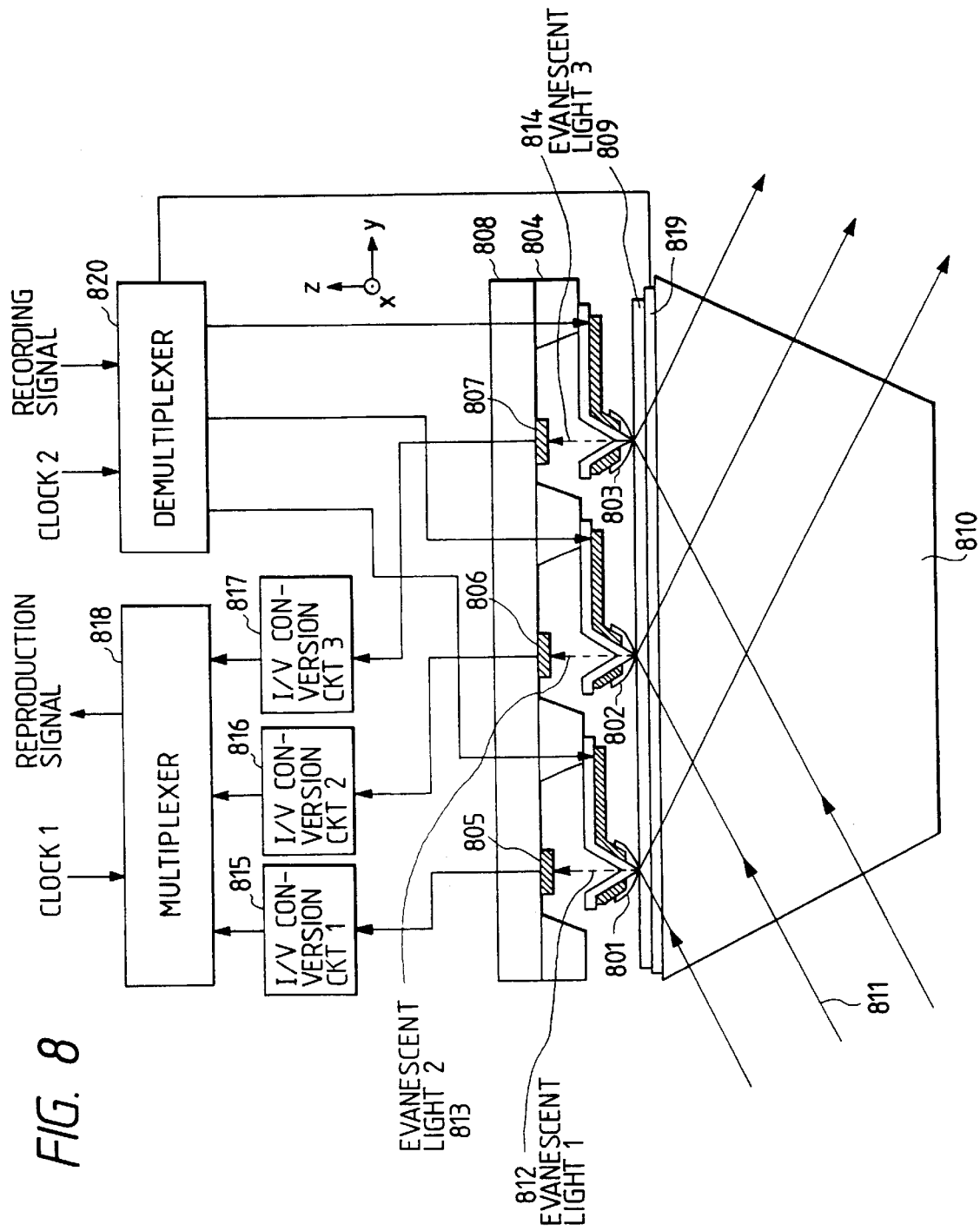

SCANNING NEAR-FIELD OPTICAL MICROSCOPE USING THE PROBE AND RECORDING AND/OR REPRODUCING APPARATUS USING THE PROBE

This is a divisional application of application Ser. No. 08/825,129, filed Dec. 20, 1999, now U.S. Pat. No. 6,046,972.

BACKGROUND OF THE INVENTION

1. Field of the Invention

The present invention relates to a method of manufacturing or producing a probe with a minute aperture suitable for use in a scanning near-field optical microscope, an information recording and/or reproducing apparatus using the principle of that scanning near-field optical microscope and the like, a scanning near-field optical microscope using that probe and a recording and/or reproducing apparatus using that probe.

2. Related Background Art

In recent years, a scanning tunneling microscope (hereinafter referred to as STM) has been developed to make it possible to observe the surface of conductive material with the sub-nanometer resolution (see U.S. Pat. No. 4,343,993). Thus, the arrangement of atoms on the surface of metal, semiconductor or the like, orientation of organic molecules and the like can be observed on an atomic or molecular scale.

Further, the STM technology has been expanded, and an atomic force microscope (hereinafter referred to as AFM) has been developed to make it possible to observe the surface of an insulating material or the like with a resolution similar to that of the STM (see U.S. Pat. No. 4,724,318).

Further, as the developed STM, a scanning near-field optical microscope (hereinafter referred to as SNOM) has been proposed to examine the surface condition of an object by using evanescent light issuing from a minute aperture formed at a sharp tip of a probe (see Durig, et al, J. Appl. Phys. 59, 3318 (1986)).

Furthermore, a photon STM (hereinafter referred to as PSTM) has been also developed, which is a kind of SNOM for examining the surface of an object by inputting light into the object from its bottom surface through a prism under the condition of total reflection and detecting evanescent light, which exudes toward the object surface, by an optical probe from the side of the object surface (see Reddick, et al, Phys. Rev. B39, 767 (1989)).

In the above SNOM, various kinds of methods for fabricating an optical probe have been devised so far since the resolution is determined by the tip diameter of the optical probe. For example, in order to increase the resolution, no minute aperture is formed at the tip of the optical probe in the PSTM and instead the tip of an optical fiber, which is used as the optical probe, is sharpened by optimizing chemical etching conditions on the end surface of the optical fiber.

Further, at the initial stage of manufacturing an SNOM, the intersection portion between cleaved surfaces of transparent crystal is coated with metal, the metal at the intersection portion is pushed against a hard face and removed therefrom and thus the pushed intersection portion is exposed to form a minute aperture (see European Patent No. 0112402). More recently, a method for forming a minute aperture by using a lithographic method has been also used.

Furthermore, a method for fabricating an optical probe by constructing integrate minute aperture and light waveguide has been proposed (see U.S. Pat. No. 5,354,985).

However, in the above conventional technologies, where no minute aperture is formed in the optical probe as in the PSTM, stray light other than the evanescent light, such as light scattering generated due to an uneven portion of the object surface, is undesirably detected and the resolution is likely to be lowered.

Further, in the method in which the optical fiber is etched, it is difficult to fabricate an integrated and compact optical probe.

In the conventional method of forming the minute aperture in which the cleaved surfaces of the crystal is used, the size of the diameter of the minute aperture is apt to vary and its yield is not good. In addition, integration and compact construction are hard to attain.

Further, in the conventional method of forming the minute aperture using the photolithography, the limit in the diameter of the aperture is about 100 nm due to the limitation in precision of its processing apparatus, and thus it is difficult to fabricate the minute aperture with a diameter of about 10 nm. Hence, there is a limitation of the resolution of the SNOM apparatus. Furthermore, the processing is apt to be complicated, considerable time is required and its cost is relatively high.

If EB (electron beam) processing apparatus or FIB (focused ion beam) processing apparatus is used, it is in principle possible to form an aperture of less than 100 nm. However, the positional alignment control is complicated and variation is likely to occur. Further, yield is not good since the processing is performed point by point.

SUMMARY OF THE INVENTION

Therefore, in order to solve the above problems of the above-discussed conventional technologies, it is an object of the present invention to provide a method of fabricating a probe having a minute aperture with a reduced variation in its size, according to which the minute aperture can be readily formed in a short time with good yield, an integrate and compact structure can be achieved and the resolution is improved, a probe formed by this method, a composite apparatus of scanning near-field optical microscope and scanning tunneling microscope using this probe and a recording and/reproducing apparatus using this probe.

In order to achieve the above object, there is provided a method of fabricating a probe with a minute aperture, which includes the steps of:

coating the probe with conductive material; and bringing a tip of the probe into contact with a conductive substrate and applying a voltage between the probe and the substrate to remove the coating material at the tip of the probe and form the minute aperture at the tip of the probe.

Further, in order to achieve the above object, there is provided a scanning near-field optical microscope for observing an object on the basis of a change in intensity of near-field light, which includes:

a probe having a minute aperture at its tip;

a unit for moving the probe relatively to the object;

a unit for illuminating the object with light; and a photodetector arranged at the back of the minute aperture to detect the intensity of the near-field light created by the light illumination and passing through the minute aperture.

Further, in order to achieve the above object, there is provided an information recording and/or reproducing apparatus for reproducing information recorded in a record medium by using near-field light, which includes:

a probe having a minute aperture at its tip;

a unit for moving the probe relatively to the record medium;

a unit for illuminating the record medium with light;

a photodetector arranged at the back of the minute aperture to detect the intensity of the near-field light created by the light illumination and passing through the minute aperture; and a unit for reproducing the information on the basis of the detected light intensity.

The above and other objects and features of the present invention will become apparent from the following description.

BRIEF DESCRIPTION OF THE DRAWINGS

FIG. 2A is a plan view of FIG. 1A and FIG. 2B is a plan view of FIG. 1C;

FIG. 8 is a view showing the structure of a recording and/or reproducing apparatus using a plurality of probes of the present invention.

DETAILED DESCRIPTION OF THE PREFERRED EMBODIMENTS

The preferred embodiments of the present invention will be described in detail below with reference to the accompanying drawings.

According to the present invention, there can be provided a method of fabricating a probe having a minute aperture with a reduced variation according to which the minute aperture can be readily formed in a short time with good yield, an integrate and compact structure can be achieved with improved resolution, and a probe formed by this method. Further, a composite apparatus of scanning near-field optical microscope and scanning tunneling microscope using the thus-produced probe can be constructed, and a measurement resolution can be improved. Furthermore, a recording and/or reproducing apparatus using this probe can be constructed, and a reproduction accuracy can be enhanced. In addition, a multiple structure can be built by a plurality of the probes, and hence high-speed recording and/or reproduction of a large capacity of data can be achieved.

Embodiments of the present invention will be described hereinafter with reference to the drawings.

FIGS. 1A, 1B, 1C, 2A, 2B, 3A, 3B, 3C and 3D illustrate a fabrication method of a probe with a minute aperture according to the present invention. Initially, regarding the fabrication method of the probe, a fabrication method of an elastic cantilever with a probe tip having a tip portion coated with metal will be described with reference to FIGS. 3A to 3D.

Figure 3A:
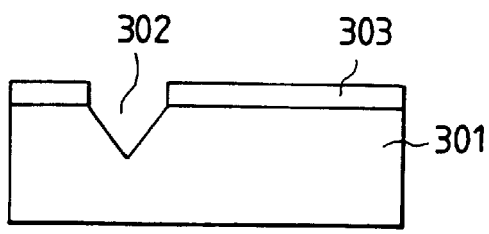
FIGS. 3A, 3B, 3C and 3D are respectively cross-sectional views showing a method of the present invention for fabricating an elastic cantilever having a probe tip coated with metal.

As illustrated in FIG. 3A, an $SiO_2$ mask 303 is deposited on an Si substrate 301 having a face orientation (100), except for a square portion of $5\mu \times 5\mu$, and anisotropic etching is performed using a potassium hydroxide (KOH) solution, by which means a pyramid-shaped recess or groove 302 is formed.

Figure 3B:
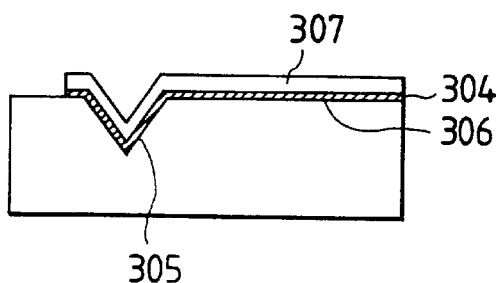

Then, after a Pt (platinum) layer 304 having a thickness of 0.1 $\mu$m is formed by a sputtering method as illustrated in FIG. 3B, and the patterning of a probe-tip coat portion 305 and an electrode wiring 306 is performed. After that, an $Si_3N_4$ layer 307 having a thickness of 1 $\mu$m is formed by a low pressure chemical vapour deposition (LP-CVD), and then the patterning of a cantilever shape is conducted.

Figure 3C:
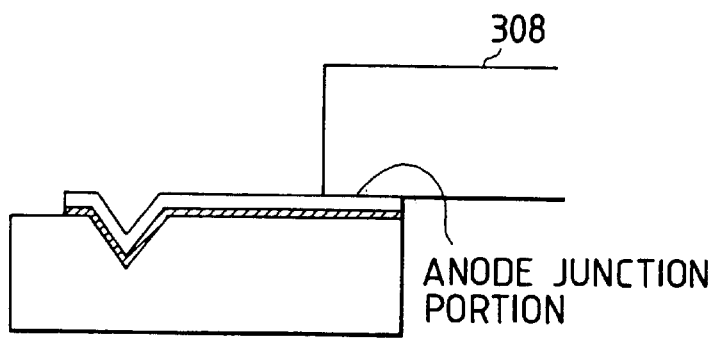
Figure 3D:
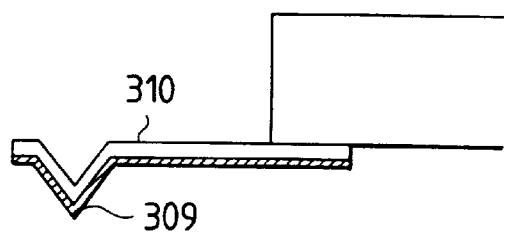

Further, a glass substrate 308 is anode-joined (see an anode junction portion) to support the cantilever, as illustrated in FIG. 3C. Finally, as illustrated in FIG. 3D, the Si substrate 301 is removed by a KOH solution, and thus an elastic cantilever 310 having a probe tip 309 coated with Pt is formed.

Figure 1A:
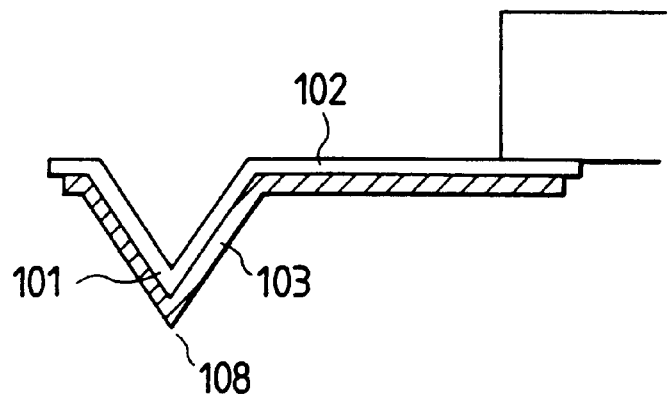
FIGS. 1A, 1B and 1C are respectively cross-sectional views showing a method of the present invention for forming a minute aperture.
Figure 1B:
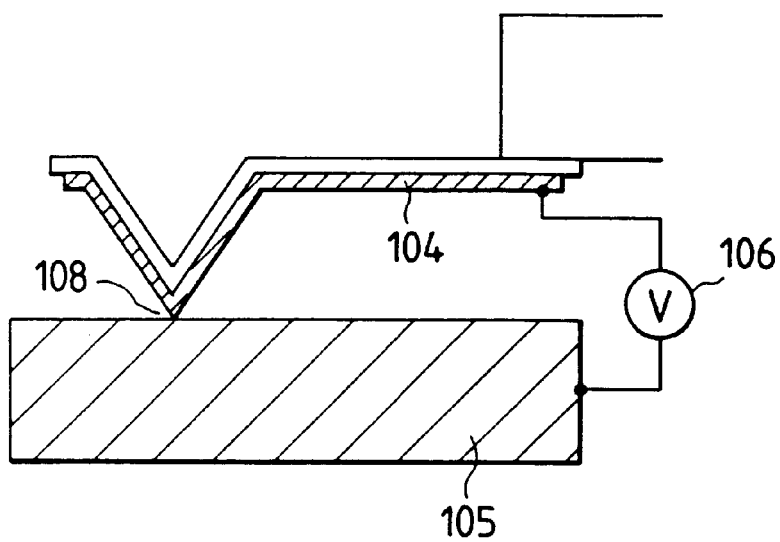
Figure 1C:
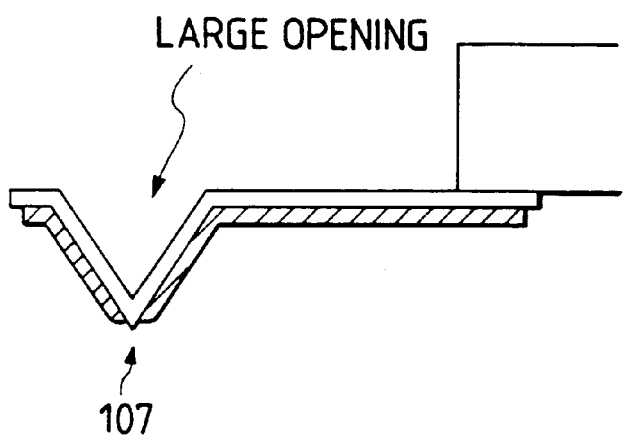
Figure 2A:
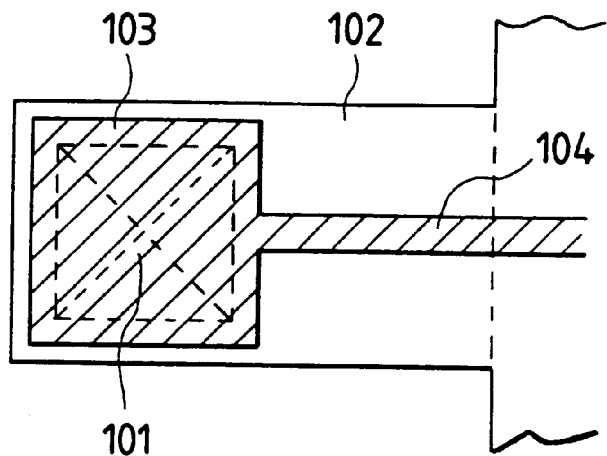
FIGS. 2A and 2B are respectively views showing the method of the present invention for forming the minute aperture.
Figure 2B:
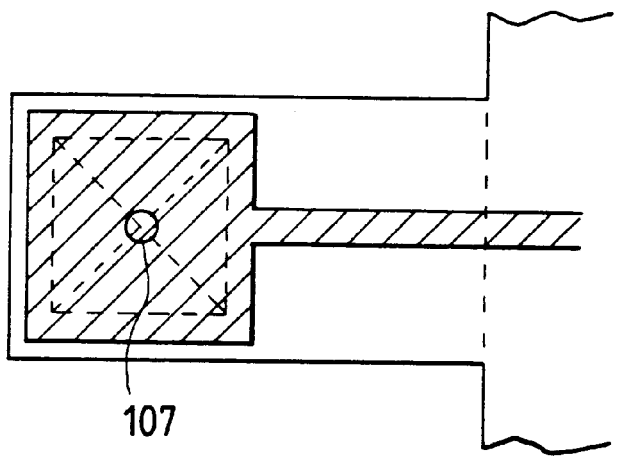

FIGS. 1A, 1B and 1C show a method of forming a minute aperture in the thus-fabricated cantilever with the metal-coated probe. FIGS. 2A and 2B are plan views corresponding to FIGS. 1A and 1C.

In FIGS. 1A and 2A, reference numeral 101 designates a probe portion with its sharp tip, reference numeral 102 designates an elastic cantilever and reference numeral 103 designates a metal coating. A probe portion 108 covered with metal is brought into contact with a metal substrate 105, and a voltage is applied between the probe portion 108 and the metal substrate 105 by a voltage applying unit 106 through an electrode wire 104. The coating metal layer at the probe tip portion is removed by electric-field evaporation or thermal melting, thus forming a minute aperture.

Here, the degree of removal of the coating metal film or the diameter of the minute aperture can be controlled by respectively controlling (1) a diameter of the probe tip, (2) a film thickness of the coating metal 108, (3) a contact force of the probe tip against the metal substrate 105 and (4) a condition of the above applied voltage. As the probe tip diameter decreases, a contact area of the probe tip against the metal substrate 105 becomes smaller, and the area of applied electric field and the area of current flow concentrate when the voltage is applied. Thus, the area, where the coating metal film is removed, decreases.

In order to reduce the probe tip diameter, a forming method and metal material, which makes it possible to form a rough metal surface when the coating metal film is formed, can be selected, other than a method of sharpening the probe itself by the sharpening treatment.

In an example in the above-discussed forming method of the elastic cantilever, low-temperature thermal oxidation is performed after the pyramid-shaped groove is formed by anisotropic etching and thus the tip or bottom of the pyramid-shaped groove can be sharpened. Further, where the Pt film is formed, when the sputtering method rather than the evaporation method is selected, Pt grains for forming the Pt film become fine and thus the coated probe tip can be sharpened.

When the film thickness of the coating metal film is small, the area of applied electric field and the area of current flow concentrate when the voltage is applied, similar to the case where the diameter of the probe tip is small. Thus, the area where the coating metal film is removed, decreases.

However, though depending on the forming method, if the film thickness of the metal film becomes less than 100 nm, there is a tendency that a continuous film is hard to attain. If so, the film is unsuitable for the probe of this invention, and hence it is desirable that the thickness of the metal film is approximately 100 nm.

Further, as the contact force decreases, the contact area of the probe tip against the metal substrate decreases and thus the area, where the coating metal film is removed, also becomes small. The following method may be taken to reduce the contact force. The contact force of the metal-coated probe portion 108 against the metal substrate 105 can be controlled to be set to a desired value by elastically deforming the elastic cantilever 102. For example, when the elastic constant with respect to the elastic deformation of the elastic cantilever 102 (this is a reduced value relative to the position of the probe portion) is indicated by k, the contact force can be below k$\Delta$z by decreasing the amount of the elastic deformation of the elastic cantilever 102 (this is a reduced value relative to the position of the probe portion) due to its contact against the metal substrate 105 to below $\Delta$z. Further, magnitudes and changes with time of the electric field applied to the probe tip and the current flowing between the probe and the metal substrate can be controlled by adjusting crest value, waveform, time width and load resistance of the applied voltage. Thus, the degree of removal of the coating metal film can be controlled.

Actually, in the case where the probe with the metal coating material of Pt and the tip diameter of 20 nm is prepared and the elastic cantilever is brought into contact with a metal substrate of Au under the condition under which the amount of elastic deformation of the elastic cantilever with its elastic constant of 0.1 N/m is set to less than 1 $\mu$m, i.e., the contact force is set to less than $10^{-7}$ N, the diameter of the minute aperture was about 10 nm when the voltage with the crest value of 10 V, square waveform, time width of 100 $\mu$s and load resistance of 1 M$\Omega$ was applied.

In the method of forming the minute aperture of the present invention, the diameter of the minute aperture could be controlled in a range between 3 nm and 1000 nm when (1) the diameter of the probe tip, (2) the film thickness of the coating metal, (3) the contact force of the probe tip against the metal substrate and (4) the condition of the applied voltage were changed. However, in a case where the aperture with the diameter of above 100 nm is formed, the shape of the aperture is likely to be unstable and the probe tip is likely to be broken, maybe for the reason that formation conditions, such as the voltage application condition, the contact force condition and the like, are excessive. Therefore, such a probe is less preferred as the probe of the present invention. Further, where the aperture is less than 10 nm, its reproducible property is not good. Therefore, the range, in which the aperture can be stably formed, was a range between about 10 nm and about 100 nm.

The coating metal of the probe with the thus-formed minute aperture is removed from the probe tip, so the probe tip is not conductive.

Figure 4:
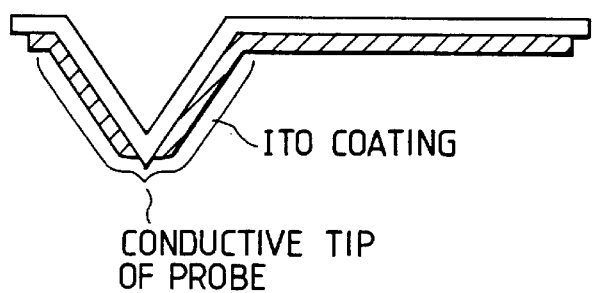
FIG. 4 is a cross-sectional view showing the structure of a probe having a conductive probe tip.

Therefore, in the case where the prove is used in an apparatus which requires the electric conductivity of the probe tip, a portion close to the probe tip only needs to be coated with transparent conductive material, such as ITO, by the sputtering method or the like, as illustrated in FIG. 4. Alternatively, a monomolecular built-up film of conductive material, such as polydiacetylene, may be formed on the portion close to the probe tip by Langmuir-Blodgett's technique.

Figure 5:
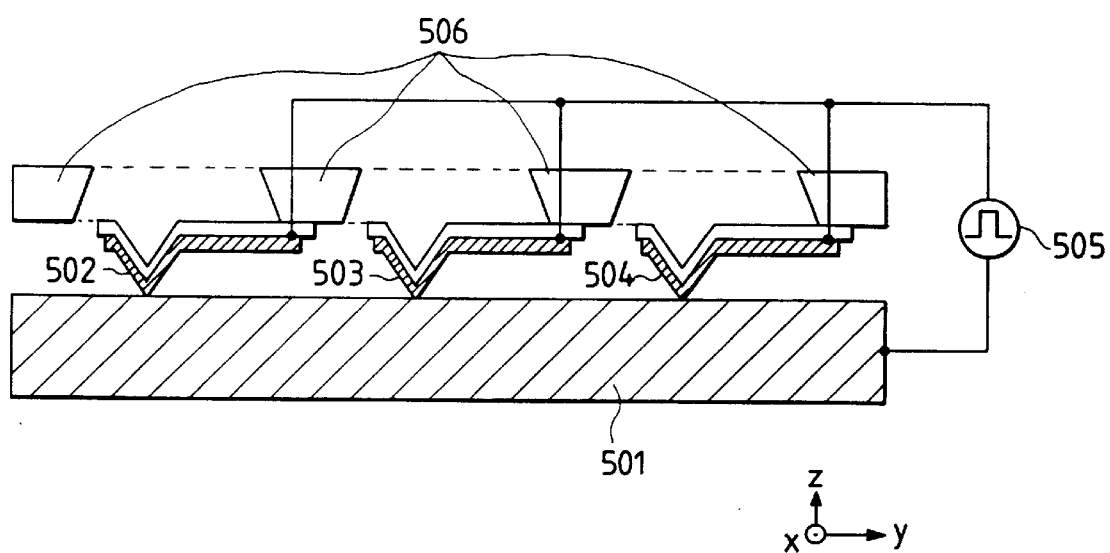
FIG. 5 is a sectional view showing a method for simultaneously fabricating a plurality of minute apertures in a plurality of probes.

The above method of forming the probe with the minute aperture can be particularly suitably utilized as a method for simultaneously forming minute apertures in a plurality of probes. As illustrated in FIG. 5, probe tips of a plurality of probes 502, 503 and 504 are brought into contact with a metal substrate 501, and a voltage is applied between the plural probes and the metal substrate using a voltage applying unit 505. Thus, a plurality of apertures can be simultaneously formed.

Since the plural probes are respectively constructed using elastic cantilevers, even if positional variation in the z-direction in FIG. 5 of the probe tip relative to the metal substrate surface exists due to errors during the fabrication process of the plural probes and the like, the following state can be established: In this state, all the probe tips are in contact with the surface of the metal substrate under the condition under which magnitudes of the contact forces between the probe tips and the metal substrate are below a certain value. For example, where k is the elastic constant of the elastic cantilever and $\Delta$z' is the maximum value of the positional variation in the z-direction of the probe tip relative to the metal substrate surface occurring due to errors during the fabrication process of the plural probes and the like, since the variation in the contact force in the state, in which all the probe tips are brought into contact with the surface of the metal substrate, is k$\Delta$z', magnitudes of all the contact forces can be below k$\Delta$z' in the state in which all the probe tips are in contact with the surface of the metal substrate, by controlling the positions in the z-direction of a support member 506 for the plural probe tips and the substrate 501.

In a method of applying the voltage, a demultiplexer can be used. In this case, the voltage is applied to the plural probes in turn and the minute apertures are successively formed in the plural probes. In this case, however, it takes considerable time to form the minute apertures. To solve this disadvantage, it is desirable to apply the voltage while the metal substrate 501 and the support member 506 for the plural probes are moved relative to the metal substrate in a plane parallel to the metal substrate surface. Thereby, the following fear can be prevented: The coating metal material removed from the probe tip during the fabrication of the aperture in a part of the probes can be prevented from being caught between the probe tip and the metal material, and a conductive state or a low-resistance state is created between the probe tip and the metal substrate. As a result, the value of the applied voltage in other probes is lowered, and the minute apertures cannot be formed.

Since the above disadvantage (catching of the removed material) is removed in this method, minute apertures are simultaneously formed in the plural probes without fail.

Figure 6:
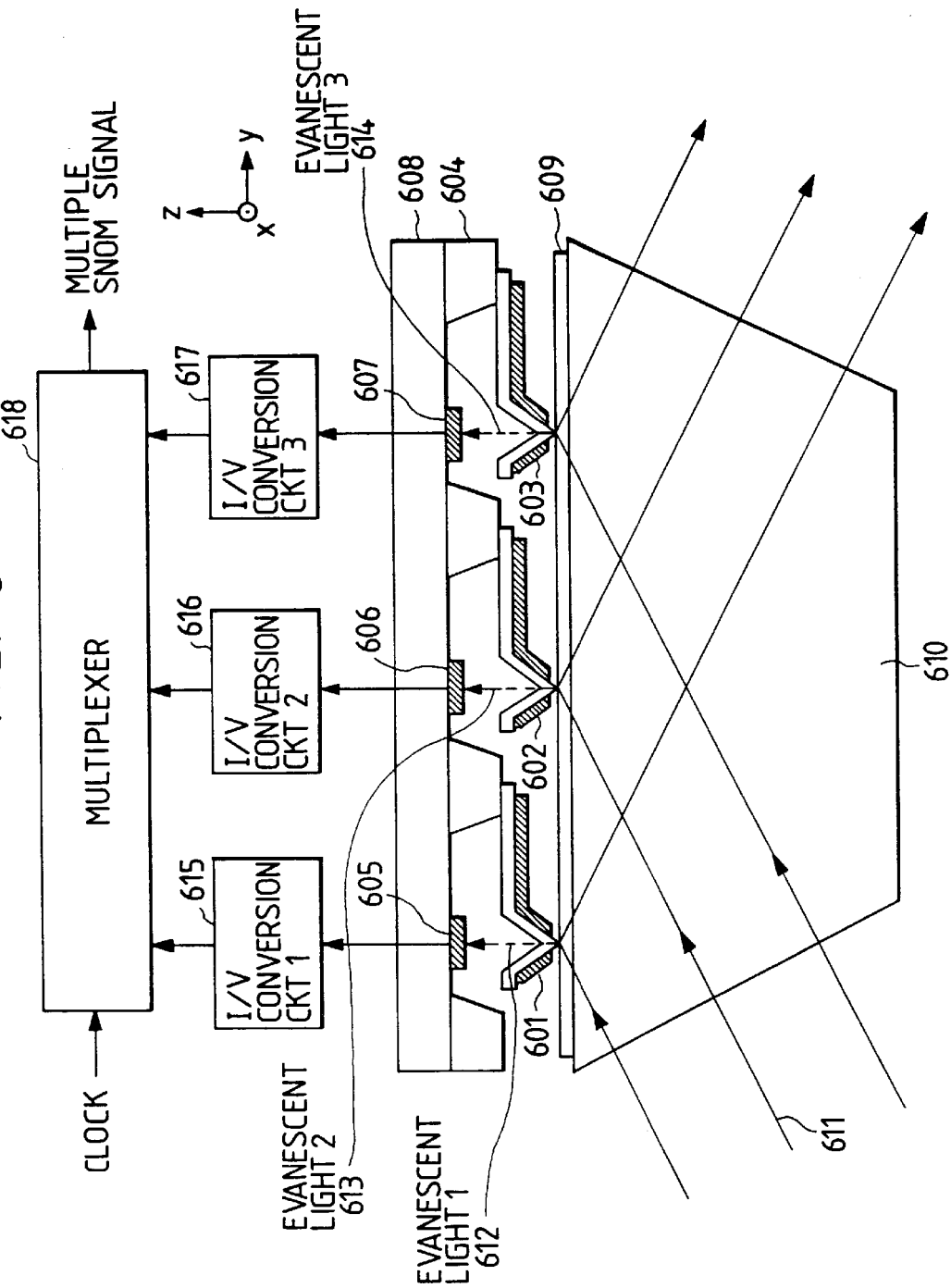
FIG. 6 is a view showing the structure of a multiple SNOM using a plurality of probes of the present invention.

Now, the application of the thus-fabricated probe will be described. FIG. 6 illustrates an example of a multiple SNOM using a plurality of probes of the present invention. In FIG. 6, reference numerals 601, 602 and 603 designate SNOM probes 1, 2 and 3 using the probe of this invention, respectively. The plural SNOM probes 1, 2 and 3 are integrated with a probe support member 604. Further, a photodiode support member 608, on which a plurality of high-sensitivity photodiodes 1 (605), 2 (606) and 3 (607), such as avalanche photodiodes, are mounted, is fixed to and integrated with the probe support member 604. The design and structure are constructed such that the positions of the photodiodes 1–3 (605–607) are at the back (in FIG. 6, above) of corresponding minute apertures of the SNOM probes 1–3 (601–603).

In the probe of this invention, since there is no metal coating at a place opposite to the minute aperture of the probe, an opening having a diameter (about several microns) larger than the minute aperture exists at the back of the minute aperture (see FIGS. 1A to 1C). Therefore, there appears a space at the back of the minute aperture, and the light detecting mechanism, such as the photodiode, can be disposed close to the probe without using a light waveguide or the like. Hence, the probe can be integrated with a light detecting mechanism which does not reduce the light detection resolution. An object 609 to be measured is put on a transparent substrate 610. Light 611 is input into the object 609 through the transparent substrate 610 from the back side of the object 609 at an angle which satisfies the total reflection condition on the surface of the object 609. At this time, though the light is not transmitted through the surface of the object 609 and does not emerge upward (in FIG. 6), evanescent light issues from the surface of the object 609 within the distance of less than 0.1 μm from its surface. At this time, when the probe tips of the plural SNOM probes 1–3 (601–603) are so positioned as to be in contact with the object, the evanescent light 1 (612), 2 (613) and 3 (614) pass through the minute apertures of the SNOM probes and is detected by the photodiodes 1–3 (605–607) located at the back of the minute apertures. Current signals of the detected evanescent light are converted into voltage signals by I/V conversion circuits 1 (615), 2 (616) and 3 (617), and a multiple SNOM signal is created therefrom by a multiplexer 618.

Since the plural SNOM probes are respectively elastic cantilevers, the following state can be established: In this state, all the probe tips are in contact with the surface of the object under the condition under which magnitudes of the contact forces between the probe tips and the object are below a certain value. For example, where k is the elastic constant of the elastic cantilever and Δz" is the maximum value of the positional variation in the z-direction of the probe tip relative to the object surface occurring due to errors during the fabrication process of the plural SNOM probes and the like, since the variation in the contact force in the state, in which all the probe tips are brought into contact with the surface of the object, is kΔz", magnitudes of all the contact forces can be below kΔz" by controlling the positions in the z-direction of the probe support member 604 and the object 609.

Thereby, damage to the probe tips and the object due to large contact forces can be prevented. In FIG. 6, an xy actuator (not shown) is used, the object 609 is moved relatively to the plural SNOM probes 1–3 in directions (x- and y-directions in FIG. 6) on the object surface in a two-dimensional relative scanning manner, and magnitudes of the SNOM signals at respective positions in the xy plane are plotted. Thus, the SNOM observation image of the surface of the object 609 can be obtained.

Figure 7:
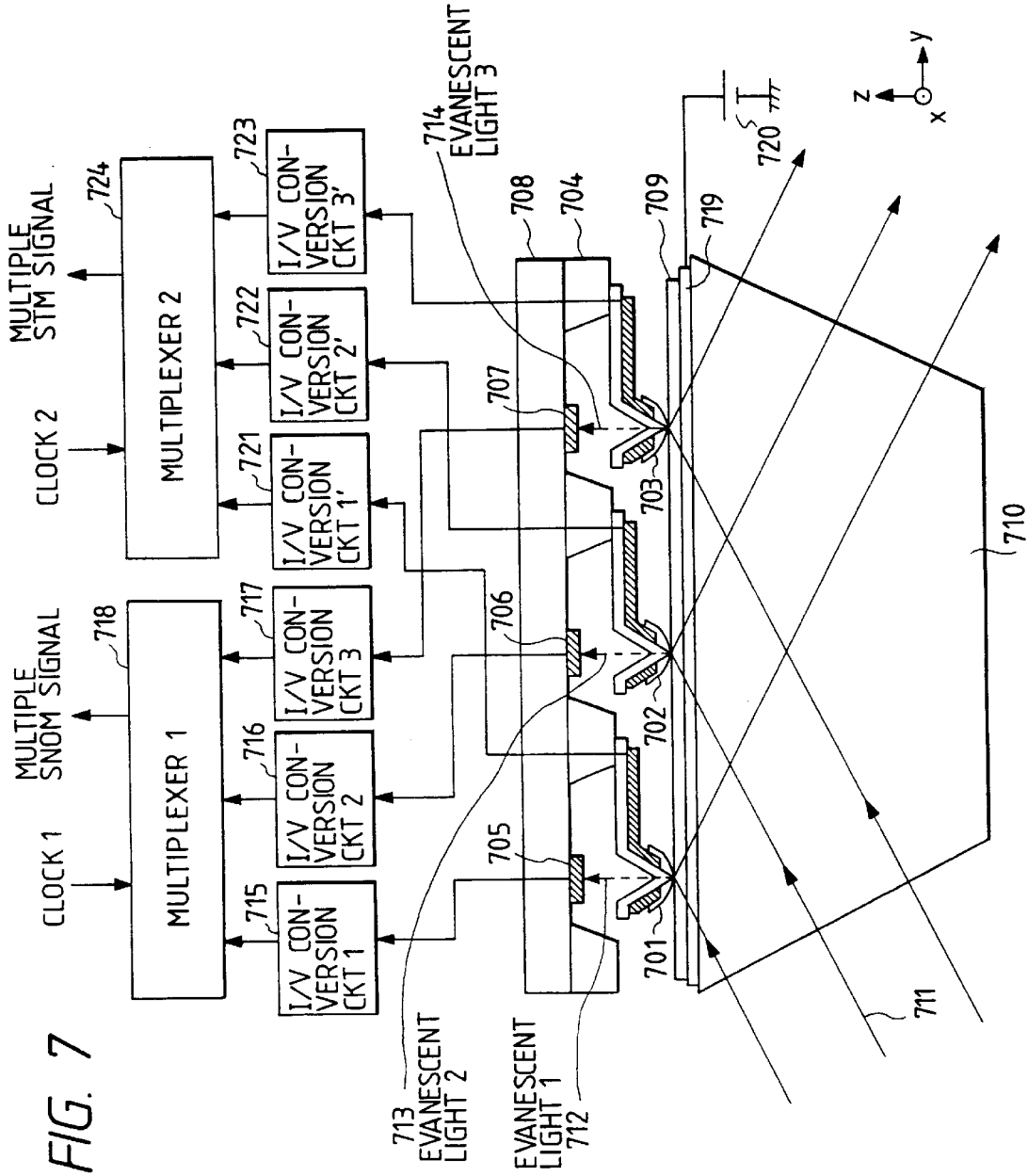
FIG. 7 is a view showing the structure of a multiple SNOM/STM using the conductive probe of the present invention.

FIG. 7 illustrates an example of a multiple SNOM/STM using the conductive probes of the present invention.

In FIG. 7, reference numerals 701–703 respectively designate conductive SNOM probes 1–3. Reference numeral 704 designates a support member for the probes. Reference numerals 705–707 respectively designate photodiodes 1–3. Reference numeral 708 designates a support member for the photodiodes. Reference numeral 709 designates an object. Reference numeral 710 designates a transparent substrate. Reference numeral 711 designates light. Reference numerals 712–714 designate evanescent light 1–3. Reference numerals 715–717 respectively designate I/V conversion circuits 1–3. Reference numeral 718 designates a multiplexer 1.

The structure, functions and operations of those structures are the same as those described with reference to FIG. 6. This example differs from the example of FIG. 6 in that a transparent electrode 719 made of transparent conductive material, such as ITO, is formed on the transparent substrate 710 and the object 709 is put on the transparent electrode 719. The transparent electrode 719 is connected to a bias voltage applying unit 720, and a bias voltage is applied to the electrode. Currents flowing between the probe tips of the conductive SNOM probes 1–3 (701–703) and the transparent electrode 719, i.e., currents flowing through a portion of the object in contact with the probe tips are converted into voltage signals by I/V conversion circuits 1' (721), 2' (722) and 3' (723), and a multiple STM signal is created therefrom by a multiplexer 2 (724). Together with the SNOM signal, magnitudes of the STM signals at respective positions in the xy plane during the two-dimensional relative scanning are plotted, and hence the SNOM/STM simultaneous observation image of the surface of the object 709 can be obtained.

Next, FIG. 8 illustrates an example of a recording/reproducing apparatus using a plurality of probes of the present invention. In FIG. 8, reference numerals 801, 802 and 803 designate recording and reproducing probes 1, 2 and 3 using the conductive probe of this invention, respectively. The plural recording and reproducing probes 1, 2 and 3 are integrated with a probe support member 804. Further, a photodiode support member 808, on which a plurality of high-sensitivity photodiodes 1 (805), 2 (806) and 3 (807), such as avalanche photodiodes, are mounted, is fixed to and integrated with the probe support member 804. The design and structure are constructed such that the positions of the photodiodes 1–3 (805–807) are at the back (in FIG. 8, above) of corresponding minute apertures of the recording and reproducing probes 1–3 (801–803).

A record medium 809 is put on a transparent electrode 819 on a transparent substrate 810. The probe tips of the plural recording and reproducing probes 1–3 (801–803) are so positioned as to be in contact with the surface of the record medium 809.

A voltage signal of information to be recorded is divided by a demultiplexer 820, and the divided ones are applied to the conductive probes of the respective recording and reproducing probes 1–3 (801–803). The recording is performed on a local portion of the record medium 809 with which the conductive probe is in contact. The record medium 809 is made of material whose optical characteristic is changed by the application of a voltage or electric-field, or injection of current (described below).

A reproducing method of reproducing the thus-recorded information will be described. Light 811 is input into the record medium 809 through the transparent substrate 810 from the back side of the record medium 809 at an angle which satisfies the total reflection condition on the surface of the record medium 809. At this time, though the light is not transmitted through the surface of the record medium 809 and does not emerge upward (in FIG. 8), the evanescent light escaped from the surface of the record medium 809 within a distance of less than 0.1 μm from its surface. At this time, the evanescent light 1 (812), 2 (813) and 3 (814) passes through the minute apertures of the recording and reproducing probes and is detected by the photodiodes 1–3 (805–807) located at the back of the minute apertures. Current signals of the detected evanescent light are converted into voltage signals by I/V conversion circuits 1 (815), 2 (816) and 3 (817), and those voltage signals are combined by a multiplexer 818. Thus, a reproduced signal is created therefrom.

Since the plural recording and reproducing probes are respectively constructed by elastic cantilevers, the following state can be established: In this state, all the probe tips are in contact with the surface of the record medium under the condition under which magnitudes of the contact forces between the probe tips and the record medium are below a certain value. For example, where k is the elastic constant of the elastic cantilever and Δz" is the maximum value of the positional variation in the z-direction of the probe tip relative to the record medium surface occurring due to errors during the fabrication process of the plural recording and reproducing probes and the like, since the variation in the contact force in the state, in which all the probe tips are brought into contact with the surface of the record medium, is kΔz", magnitudes of all the contact forces can be below kΔz" by controlling the positions in the z-direction of the probe support member 804 and the record medium 809.

Thereby, damage to the probe tips and the record medium due to large contact forces can be prevented.

In FIG. 6, an xy actuator (not shown) is used, the record medium 809 is moved relative to the plural recording and reproducing probes 1–3 in directions (x- and y-directions in FIG. 8) on the record medium surface in a two-dimensional relative scanning manner, and recording and reproduction are executed at predetermined locations in the xy plane.

In this embodiment, since the recording and reproduction are conducted using the plural recording and reproducing probes with the minute apertures, the recording and reproduction can be performed to the record medium with a high density and at high speed.

Further, the recording is performed by the application of the voltage in this embodiment, but it is possible in the structure of this embodiment to apply a voltage under a condition under which light is illuminated. In such a case, the record medium is a medium to which the recording is conducted by applying a voltage under the light-illuminated condition.

As the record medium to be used in the recording and reproducing apparatus of this embodiment, the following record media can be used. As the record medium whose optical characteristic is changed by the voltage application, there exists a medium of 10, 12-pentacosadiynoic acid disclosed in Japanese Patent Application Laid-Open No. 4-90152, in which the voltage application causes a structural change in diacetylene derivative polymer due to Joule heat created by locally-flowing current and the peak wavelength of light absorption band is hence shifted.

As the record medium whose optical characteristic is changed by the voltage application under the light-illuminated condition, there exists a medium of azo chemical compound having quinone radical and hydroquinone radical disclosed in Japanese Patent Application Laid-Open No. 2-98849, in which photoisomerization reaction between cis-type and trans-type occurs only at the time of light illumination to form redox-pairs and the application of electric-field causes the proton movement between the redox-pairs.

In the above-discussed method of forming the probe according to the present invention, the forming method is simple and no complicated steps are needed, so the processing time for forming the minute aperture is short and the minute aperture can be formed with a small variation and with good yield. Further, its cost can be reduced and the probe can be readily integrated and made compact in size.

Further, in the minute aperture forming method of the probe fabrication method according to the present invention in which the metal-coated probe is brought into contact with metal material and the coating metal at the probe tip is removed by the voltage application, since the minute aperture with the diameter of about 10 nm can be formed, it is possible to improve the measurement resolution and reproduction precision by using the probe with this minute aperture in the SNOM or recording and/or reproducing apparatus.

Further, since the probe fabrication method of the present invention is a method suitable for the down-sizing and integration, it is possible to readily obtain a compact SNOM or recording and/or reproducing apparatus and a compact SNOM or recording and/or reproducing apparatus having a plurality of optical probes by using that probe fabrication method of the present invention.

Further, in the probe of the present invention, no conductive coating thin film is formed at an opposite side of the probe opposed to the surface of the probe tip with the minute aperture, so that a space can be provided at the back of the minute aperture and the light detecting mechanism, such as the photodiode, can be arranged without any difficulty. Thus, the probe can be integrated with the light detecting mechanism without reducing the light detecting resolution.

What is claimed is:

1. A scanning near-field optical microscope for observing an object on the basis of a change in intensity of near-field light, said microscope comprising:

a probe having a minute aperture at its tip supported by an elastic member;

means for moving the probe relatively to the object;

means for illuminating the object with light;

a photodetector to detect the intensity of the near-field light created by the light illumination and passing through the minute aperture;

first member supporting the elastic member; and a second member provided with the detector, wherein said first member and said second member are integrated so that the photodetector is arranged in the back proximity of the minute aperture.

2. A scanning near-field optical microscope according to claim 1, wherein a plurality of said probes are provided on said first member and a plurality of said photodetectors are provided on said second member, said plurality of photodetectors being arranged corresponding to respective positions of said plurality of probes.

3. An information recording and/or reproducing apparatus for reproducing information recorded in a record medium by using near-field light, said apparatus comprising:

a probe having a minute aperture at its tip supported by an elastic member;

means for moving the probe relative to the record medium;

means for illuminating the record medium with light;

a photodetector to detect the intensity of the near-field light created by the light illumination and passing through the minute aperture;

means for reproducing information on the basis of the light intensity detected by the photodetector;

a first member supporting the elastic member; and a second member provided with the photodetector, wherein said first member and said second member are integrated so that the photodetector is arranged in the back proximity of the minute aperture.

4. An information recording and/or reproducing apparatus according to claim 3, wherein a plurality of said probes are provided on said first member and a plurality of said photodetectors are provided on said second member, said plurality of photodetectors being arranged corresponding to respective positions of said plurality of probes.

* * * * *

UNITED STATES PATENT AND TRADEMARK OFFICE
CERTIFICATE OF CORRECTION

PATENT NO.     : 6,163,519
DATED          : December 19, 2000
INVENTOR(S)    : Ryo Kuroda et al.

It is certified that error appears in the above-identified patent and that said Letters Patent is hereby corrected as shown below:

<u>Title page,</u>
Item [54], "THE PROBE" (both occurrences) should read -- A PROBE --.

<u>Column 1,</u>
Lines 2 and 4, "THE PROBE" should read -- A PROBE --.
Line 24, "the" should be deleted.

<u>Column 2,</u>
Line 2, "scattering generated due to" should read -- scattered by an --.
Line 9, "is" should read -- are --.

<u>Column 3,</u>
Line 46, "integrate" should read -- integrated --.

<u>Column 5,</u>
Line 47, "prove" should read -- probe --.

<u>Column 6,</u>
Line 27, "following fear can be prevented: The" should be deleted.

<u>Column 8,</u>
Line 34, "escaped" should read -- escapes --.

Signed and Sealed this

Twenty-second Day of April, 2003

JAMES E. ROGAN
*Director of the United States Patent and Trademark Office*